United States Patent [19]

Heinzman et al.

[11] Patent Number: 4,959,409

[45] Date of Patent: Sep. 25, 1990

[54] AMINO-FUNCTIONAL COMPOUNDS AS BUILDER/DISPERSANTS IN DETERGENT COMPOSITIONS

[75] Inventors: Stephen W. Heinzman, Cincinnati; Michael J. Eis, West Chester; Molly P. Armstrong, Cincinnati, all of Ohio

[73] Assignee: The Procter & Gamble Company, Cincinnati, Ohio

[21] Appl. No.: 144,823

[22] Filed: Jan. 14, 1988

[51] Int. Cl.$^5$ .................................................. C08F 8/00

[52] U.S. Cl. ........................................ 525/61; 525/60; 525/379; 525/380; 525/383

[58] Field of Search ................... 525/61, 60, 379, 380, 525/383

[56] References Cited

U.S. PATENT DOCUMENTS

| | | | |
|---|---|---|---|
| 2,438,091 | 3/1948 | Lynch | 260/482 |
| 4,000,080 | 12/1976 | Bartolotia et al. | 252/99 |
| 4,021,359 | 5/1977 | Schwab | 252/89 |
| 4,559,159 | 12/1985 | Denzinger et al. | 252/174 |
| 4,680,339 | 2/1986 | Fong | 525/54.11 |

FOREIGN PATENT DOCUMENTS

| | | |
|---|---|---|
| 61-161243 | 7/1986 | Japan . |
| 436077 | 9/1975 | U.S.S.R. . |

OTHER PUBLICATIONS

M. Pfau, Bull. Soc. France 1967, No. 4, pp. 1117–1125.

Piccrola et al. "α- and β-Amides of N-Alkyl and Aralkyl-D,L-Aspartic Acids", Il Farmaco 24 (11), 1969, pp. 938–945.

Abshire and Berlinguet, Can. J. Chem., 44, 1966, pp. 2354–2355.

Zilkha and Bachi, J. Org. Chem., 24, 1959, pp. 1096–1098.

Laliberté and Berlinguet, Can. J. Chem., 40, 1962, pp. 163–165.

Abe et al., Yukagaku, vol. 35, pp. 17–25 and 937–944, 1986.

Tanchuk et al., Ukr. Khim. Zh. (Russ. Ed.) 43(7), 1977 pp. 733–738–Chemical Abstracts CA 87(21):168369x.

Berth et al., Angew. Chem. Internat. Edit., vol. 14, 1975, pp. 94–102.

Zini, "The Use of Acrylic Based Homo- and Copolymers as Detergent Additives", Seifen-Öle-Fette-Wachse-vol. 113, 1987, pp. 45–48 and 187–189.

*Primary Examiner*—Joseph L. Schofer

*Assistant Examiner*—J. M. Reddick

*Attorney, Agent, or Firm*—Jerry J. Yetter; Richard C. Witte

[57] ABSTRACT

Amino-functional compounds are economically prepared by reacting maleic anhydride with alcohols to form a maleate or fumarate "half-ester" which is combined with certain amines such as aspartate or glutamate, or alkanolamines, under conditions selected to avoid hydrolysis. At low molecular weights, the compounds herein are useful detergency builders; at progressively higher molecular weights within a specific range, combined builder/dispersant and typical dispersant properties emerge. Processes for preparing the compounds and useful detergent compositions containing them are described.

5 Claims, No Drawings

AMINO-FUNCTIONAL COMPOUNDS AS BUILDER/DISPERSANTS IN DETERGENT COMPOSITIONS

FIELD OF THE INVENTION

The present invention relates to compounds which can be used as builders, combined builder/dispersants and/or dispersants in detergent compositions. The compounds herein are particularly useful in liquid and granular heavy-duty laundry compositions.

1. Background of the Invention

Compositions useful as builders, dispersants or sequestrants are well-known in the art and have widely ranging chemical compositions. See, for example, Berth et al, Angew. Chem. Internat. Edit., Vol. 14, 1975, pages 94–102. Users of commercially available detergents recognize the utility of such materials in the laundry. It is difficult and somewhat arbitrary to categorize the useful compounds by names such as "builder", "dispersant" or "sequestrant", since many art-disclosed compounds have varying combinations of these useful properties, and are widely used in commerce for many purposes, including boiler scale control and water-softening. Nonetheless, experts in the art recognize that such terms reflect real differences in the properties of the compounds; certain compounds, for example, being distinctly better when used at high levels in a builder function, and others, such as polyacrylates, being better in a low-usage role of dispersant. See, for example, P. Zini, "The Use of Acrylic Based Homo- and Copolymers as Detergent Additives", Seifen-Öle-Fette-Wachse, Vol. 113, 1987, pages 45–48 and 187–189. The search for economical new materials having desirable combinations of such attributes thus continues, and the most effective test of their utility is in the simple operation of laundering fabrics.

2. Background Art

Recent disclosures of interest include that of U.S. Pat. Nos. 4,021,359, Schwab, issued May 3, 1977 and 4,680,339, Fong, issued July 14, 1987. See also Abe et al, Yukagaku 35(11): 937–944, 1986 and Tanchuk et al, Ukr. Khim. Zh. (Russ. Ed.), 43(7), 1977, pages 733–8. Schwab discloses compounds comprising water-soluble salts of partial esters of maleic anhydride and polyhydric alcohols containing at least three hydroxy groups, which sequester and retard the precipitation of calcium ions and function as detergent builders. Fong reveals a process for the synthesis of water-soluble carboxylated polymers having randomly repeated amide polymer units. Tanchuk et al disclose certain monoesters of N-($\beta$-hydroxyethyl) aspartic acid, derived by reacting butenedioate monoester with ethanolamine.

Abe et al disclose variants of polymalic acid prepared by ring-opening polymerization of benzyl malolactonate and by direct polymerization of DL-malic acid in dimethylsulfoxide. The detergent builder utility of polymalic acid and biodegradability test results are also disclosed.

The chemistry of maleic anhydride has been comprehensively reviewed. See "Maleic Anhydride", B. C. Trivedi and B. M. Culbertson, Plenum Press, New York, 1982, incorporated herein by reference. Desirably for the large-scale manufacture of laundry detergent chemicals, this compound is available in quantity. Trivedi and Culbertson and the above-referenced Schwab patent make it clear that the reactions of maleic anhydride with alcohols are known in the art. However, the further functionalization of such compounds in the manner of the present invention is apparently unexplored.

As can be seen from the foregoing and as is well-known from the extensive literature relating to laundry detergents, there is a continuing search for improved builders and dispersants. In particular, it would be advantageous to have builders and/or dispersants which can be prepared from readily-available reactants which are biodegradable.

The present invention provides a new class of builder/dispersant materials which help fulfill these needs.

SUMMARY OF THE INVENTION

The present invention encompasses compounds of the formula $(MAO)_nE$ wherein: n is an integer from 1 to about 2,500; M is H or a salt-forming cation (preferably sodium); A is selected from the group consisting of 2-(sec-substituted-amino)-4-oxobutanoate, 2-(tert-substituted-amino)-4-oxobutanoate, 3-(sec-substituted-amino)-4-oxobutanoate and 3 -(tert-substituted-amino)-4-oxobutanoate. O is oxygen covalently bonded to E; and E is a particular organic moiety, defined in detail hereinafter.

The terms "sec-substituted-amino" and "tert-substituted-amino" are here used to emphasize that the oxobutanoate derivatives encompassed contain secondary or tertiary amino groups and generally exclude oxobutanoates substituted by primary amino groups, i.e., $H_2N$-. Compounds of the invention are thus substituted aminooxobutanoates and not $H_2N$-substituted oxobutanoates.

A preferred category of materials provided herein encompasses compounds or isomeric mixtures of compounds wherein the A moiety is selected from $\ominus OC(O)C(L)HCH_2(O)C$-, $\ominus OC(O)CH_2C(L)H(O)C$- and mixtures thereof, wherein L is a moiety comprising a single secondary or tertiary amino group, provided that when L is ethanolamino, n is greater than 1.

More generally, A moieties can have either of the isomeric formulae

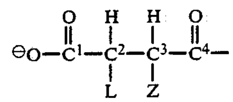
and
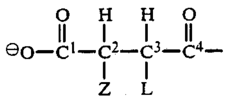

wherein the four carbon atoms of the oxobutanoate chain are numbered as shown and wherein an amino-nitrogen atom of a moiety L, now containing one or more secondary or tertiary amino groups, forms a nitrogen-carbon bond to the carbon atom $C^2$ or $C^3$.

In the isomer formulae of A, Z is typically hydrogen, hydrocarbyl or another neutral, chemically unreactive group, essential only for the purpose of completing the valencies. Preferably, as noted, Z is H and the A moieties are 2-L-substituted moieties of formula

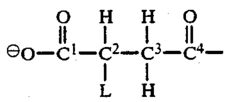

As indicated in further detail hereinafter, isomeric mixtures of compounds having a major proportion of these preferred $C^2$-L, $C^3$-H substituted A moieties and a minor proportion of $C^2$-H, $C^3$-L substituted A moieties, are also effective for the purposes of the invention and can be used, as directly prepared, as dispersants or builders.

In accordance with the above-given definition of A moieties, when M is a monovalent cation, the formula $(MAO)_nE$ can be expanded for the purposes of visualizing the general structure as follows for the 2-isomer:

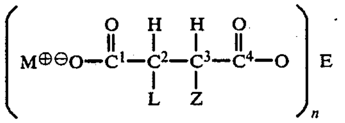

and as follows for the 3- isomer:

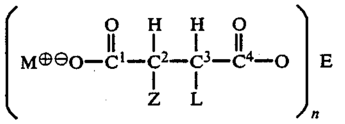

In general, E can be a monomeric or polymeric moiety having molecular weight in the range from about 15 to about 170,000. The moiety E can be charged or noncharged. When charged, E is typically anionic and can be associated with salt-forming cations such as sodium, potassium, tetraalkylammonium or the like. In general, E can include one or more hetero- atoms such as S (sulfur) or N (nitrogen). Preferably, however, E is a noncharged moiety consisting essentially of C and H, or of C, H and O.

In general, the moiety E has n sites for the covalent attachment, by means of n ester linkages, of said moieties $(MAO)_n$. Thus, each of n ester linkages in any compound $(MAO)_nE$ is formed by the connection to E of a moiety MA by means of said oxygen covalently bonded to E.

Preferred compounds $(MAO)_nE$ for dispersant applications have molecular weight of E in the range from about 200 to about 15,000; for builder applications, the moiety E is in a molecular weight range from about 15 to about 15,000. Particularly useful compounds herein are those wherein said moiety A has the formula $^{-}OC(O)C(L)HCH_2(O)C$-wherein L is selected from the group consisting of aspartate, glutamate, glycinate, ethanolamino, β-alanate, taurine, aminoethyl sulfate, alanate, sarcosinate, N-methylethanolamino, iminodiacetate, 6-aminohexanoate, N-methylaspartate and diethanolamino (see structures $L^{l-14}$ hereinafter). L is preferably aspartate, glutamate, sarcosinate, glycinate or ethanolamino, and is most preferably aspartate or glutamate.

Preferred E moieties are selected from hydrocarbyl, hydrocarbyloxy, poly(hydrocarbyl) or poly(hydrocarbyloxy) moieties and mixtures thereof in the above-noted preferred molecular weight ranges. Structurally, the preferred E moieties are further characterized in that they can be derived by complete or partial dehydroxylation of alcohols, such as those of formula EOH; to cite a simple example, if EOH is methanol, E is structurally characterized in that it is a methyl group. E is veritably the dehydroxylation product of an alcohol in a structural sense as noted, rather than in a preparative sense. Preparatively and in a mechanistic sense, esterification reactions rather than dehydroxylation reactions are more usually involved in making compounds of the invention. Thus, definition of E in structural terms is not associated with any specific process for making the compounds.

Suitable alcohols for the provision of said moiety E include compounds selected from the group consisting of polyvinyl alcohol, sorbitol, pentaerythritol, starches, glycols such as ethylene and propylene glycol, alcohols such as methanol, ethanol, propanol and butanol. However, E can also be derived from various other linear or branched polyol materials such as sucrose, oligosaccharides, β-methyl glucoside, and glycols such as $C_2$–$C_6$ alkylene glycols.

Typically, suitable alcohols are of types widely available in commerce. A somewhat more uncommon alcohol of the oligosaccharide type is available as M-138, "malto oligosaccharide mixture", Pfanstiehl Laboratories Inc. Suitable oligosaccharide variants could be prepared from cornstarch.

In general, the lower molecular weight materials herein are especially adapted for use as detergent builders. For example, compounds of this invention wherein n is 1 and E is selected from the group consisting of methyl, ethyl, propyl, butyl, ethylene, diethylene, propylene, butylene and hexylene, provide a detergent builder function.

In general, the higher molecular weight (n greater than 1, typically about 4 to about 2,500) materials herein are especially adapted as dispersants or are capable of acting both as dispersants and as builders for use in detergent compositions.

An especially preferred dispersant/builder compound herein is a random copolymer comprising essential repeat units

wherein M is sodium, A is $^{\ominus}OC(O)C(L)HCH_2(O)C$- and L is aspartate. Optional repeat units may also be present. Preferred optional repeat units are selected from

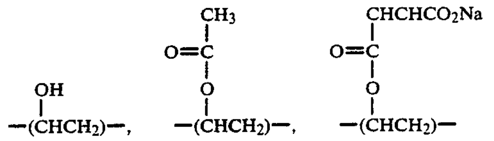

and mixtures thereof. Typically, the random copolymer comprises from about 0.10 to about 0.95 mole fraction of the essential repeat units

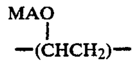

has a molecular weight in the range from about 635 to about 50,000.

The invention also encompasses processes for making the compounds. For example, the preferred random copolymer illustrated above is readily secured by (i) reacting excess maleic anhydride with a hydrolyzed polyvinyl acetate having average degree of polymerization of about 10 to about 1,500, more preferably about 15 to about 150. Preferably, this polyvinyl acetate is prehydrolyzed to polyvinyl alcohol to a high degree; on a mole percentage basis, the degree of hydrolysis is most preferably in the range from about 70 mole % to about 95 mole %.

The product of step (i) is a butenedioate halfester, which is (ii) reacted with aspartic acid in an aqueous alkaline medium to form a product which, as noted, is the random copolymer most useful as dispersant-/builder in laundry detergent applications. By using a concentrated, buffered alkaline sodium carbonate/bicarbonate reaction medium in step (ii), competing reactions, e.g., hydrolysis, are controlled so that the desired product can be secured in high yield.

The invention also encompasses detergent compositions containing conventional detersive surfactants, bleaches, enzymes, and the like, and typically from about 0.1% to about 35% by weight of the compounds of this invention.

All percentages, ratios and proportions herein are by weight, unless otherwise specified.

DETAILED DESCRIPTION OF THE INVENTION

The invention encompasses simple, low molecular weight compounds such as

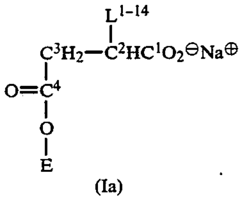

(Ia)

and

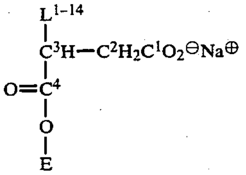

(Ib)

In the simplest compounds, E is an alkyl, alkyloxyalkylene, or alkyl(polyoxyalkylene) group; examples include methyl, ethyl, propyl, butyl, or a group such as $CH_3OCH_2CH_2$-.

In general, the L group may be attached to either of $C^2$ or $C^3$, thus forming an isomeric mixture of compounds of structure Ia and Ib. Typically, in such mixtures, the greater proportion (e.g., about 80 mole percent) of the L groups is attached to $C^2$ as depicted in Ia, the balance being attached to $C^3$, structure Ib, to the extent of from about 0 to about 20 mole percent. In structures hereinafter, such as II–IX and XI–XVI, the labels ' and * will be used to show the two alternative positions for L substitution; the preferred or major 2-isomer structure, analogous to Ia, is depicted and the minor isomer can be visualized as analogous to Ib.

Suitable groups L herein are typically selected from the following $L^1$ = 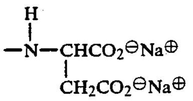

(aspartate)

$L^2$ = 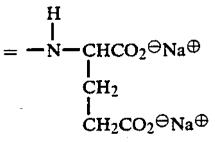

(glutamate)

-continued $L^3$ = 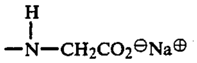

(glycinate)

$L^4$ = 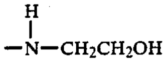

(ethanolamino)

$L^5$ = 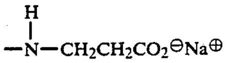

(β-alanate)

$L^6$ = 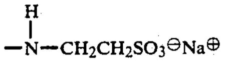

(taurine)

$L^7$ = 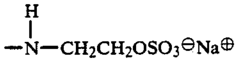

(aminoethylsulfate)

$L^8$ = 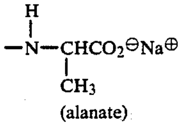

(alanate)

$L^9$ = 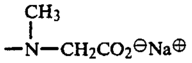

(sarcosinate)

$L^{10}$ = 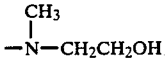

(N-methylethanolamino)

$L^{11}$ = 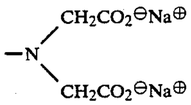

(iminodiacetate)

$L^{12}$ = 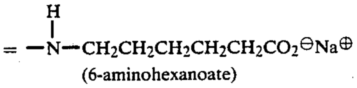

(6-aminohexanoate)

$L^{13}$ = 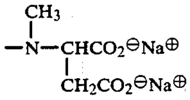

(N-methylaspartate)

$L^{14}$ = $-N(CH_2CH_2OH)_2$ (diethanolamino)

Any of the foregoing groups $L^1$-$L^{14}$ can be used in structures Ia and Ib.

When E is a polyol derivative, the formula is more complex, in that more than one of the above illustrated sec-substituted- or tert-substituted- amino moieties L can be attached to the E substrate; for example, the builder:

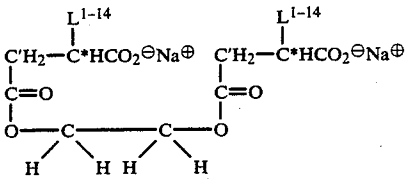
(II)

In the above, E is illustrated by the moiety $CH_2CH_2$ and, using the general formula $(MAO)_nE$ given hereinabove, n is 2. In another illustration, when the E moieties result from a pentaerythritol-like structure, compounds of the invention have the formula

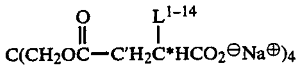
(III)

Compositions of the invention can also be prepared by partial substitution of pentaerythritol which comprise a mixture of compounds (III) together with compounds of formulae

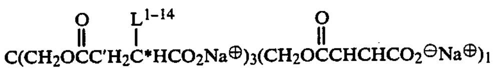
(IV)

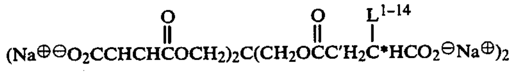
(V)

and

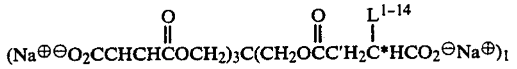
(VI)

Compositions of the invention can likewise be prepared in which methylenehydroxy groups partially replace groups attached to the quaternary carbon in any of (III), (IV), (V), and (VI). The novel component of any such composition can thus be represented by the general formula VII which encompasses structures (III) through (VI) as well as methylenehydroxy-substituted variants:

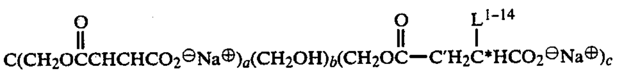
(VII)

wherein a is 0, 1, 2 or 3; b is 0, 1, 2, or 3; c is 1, 2, 3 or 4, and a+b+c=4.

Another typical compound herein includes an E moiety having a sorbitol-like structure; this compound can be represented by the formula (Fisher projection):

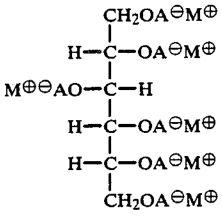
(VIII)

-continued wherein $A^{\ominus}M^{\oplus}$ is

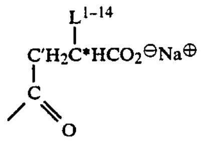
(IX)

E can also be derived from a cyclic polyol; thus, compounds of the invention can, for example, be $M^{\oplus}A^{\ominus}$-substituted α- or β-methyl glucoside derivatives; one representative β-derivative has the formula:

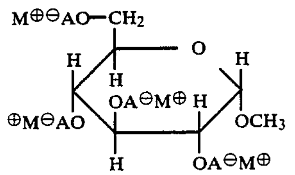
(X)

As in the above-given structures (IV) through (VII), novel compounds having proportions of (OH) groups or butenedioate half-ester, i.e., $(C(O)CHCHCO_2{}^{-}Na^{+})$ groups replacing AM groups can be present in compositions containing the compounds of formulas (VIII) or (X), especially if compounds (VIII) or (X) are not used in chemically purified form.

When E is a simple homopolymer-type group, compounds of the invention are oligomeric or polymeric; for example, a homopolymer based on polyvinyl alcohol fully substituted by groups of structure (IX) is represented by:

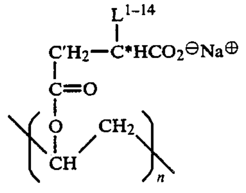
(XI)

The end-groups of the homopolymer in this instance will be the usual PVA end-groups, dependent upon well-known initiators and terminators used in PVA synthesis.

Co-oligomers or copolymers having the essential (MAO) units can also be prepared. These may be simple copolymers, or may be terpolymers, tetrapolymers or the like. Random polymers according to the invention typically contain, by way of essential units, units of the formula (XI); a particular copolymer of interest herein is represented by the units

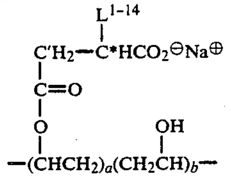
(XII)

wherein both head-to-tail and tail-to-head arrangements of the a and b units occur.

Also encompassed herein are random oligomers or polymers represented by formulas such as (XIII)-(XV).

(XIII)

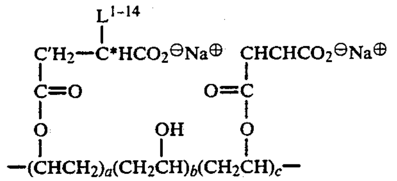

and (XIV)

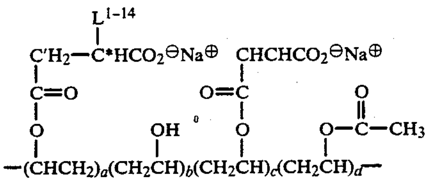

A more complex oligomer or polymer can be derived by bisulfite addition across a proportion of the c- units in (XIV), yielding:

(XV)

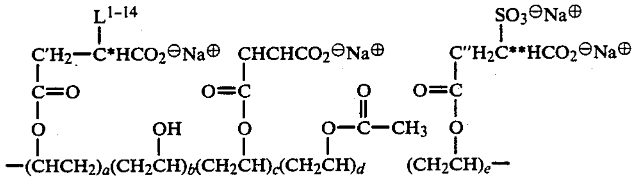

in which instance addition of sulfate will favor the carbon atom at the C** position.

In (XIII)-(XV), the (a) essential repeat units are complemented by the optional units having subscripts (b)-(e). C″ and C** are defined in a manner analogous to C′ and C*; thus sulfonation at C** is preferred.

A preferred polymeric compound of the invention having mer- units containing amino-, alcohol and acetate moieties is represented by the formula (XVI)

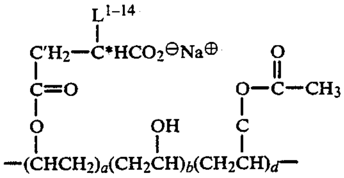

Head-to-tail and tail-to-head arrangements of the units are included. Units (a+b+d) together typically sum to a value of about 100. In one preferred embodiment, a is 60 or higher, b is about 25 and d is about 15.

In all of the foregoing formulas, sodium cations can be replaced by other cations, especially H+ or other water-soluble cations such as potassium, ammonium and the like.

METHODS FOR PREPARING COMPOUNDS OF THE INVENTION

First Step

The compounds of the invention are generally prepared by a two-part procedure. The first step of this procedure generally involves reacting maleic anhydride with compounds which contain hydroxyl groups so as to form butenedioate half esters. Typical of such hydroxyl-containing compounds (alcohols) are polyvinyl alcohol, pentaerythritol, tripentaerythritol, sorbitol, 1,3-propanediol, ethanol, isopropanol, n-butanol and methanol.

The step 1 reaction can be conducted with or without a catalyst; generally a basic catalyst such as sodium carbonate or sodium acetate is used. A solvent for the reaction is not generally necessary since the compound containing the hydroxyl group is typically either soluble in maleic anhydride or swelled by maleic anhydride. When a solvent is used, one suitable for swelling or solubilizing the hydroxyl-containing compound is selected; solvents such as tetrahydrofuran, dioxane and dimethylformamide are satisfactory.

The choice of reaction temperature for step 1 depends on the steric environment of the hydroxyl groups; esterification of secondary alcohols usually requires a higher reaction temperature than esterification of primary alcohols. Generally a reaction run in THF at reflux (approximately 65° C.) is sufficient to esterify most primary and secondary hydroxyl groups. Reactions run without solvent require higher temperatures, usually between about 80° C. and about 120° C. to achieve the same extent of esterification as reactions run with solvent.

The amount of maleic anhydride required for the reaction is selected in dependence of (a) whether the hydroxyls are primary or secondary;
(b) the degree of esterification desired; and
(c) whether a solvent to be used.

if the hydroxyl groups are primary, a 1:1 molar ratio or hydroxyl groups to maleic anhydride will typically result in esterification of more than 60 mole percent of the hydroxyl groups, provided that a solvent is used and that a temperature of 65° C. or above is employed. Under the same reaction conditions, secondary alcohols may require as much as a 2:1 molar excess of maleic anhydride to hydroxyl groups in order to achieve a similar degree of esterification. When lesser degrees of esterification are desired, a molar deficiency of maleic anhydride to hydroxyl groups may be employed, and a solvent will generally be used in the reaction.

When the reactions is conducted without solvent, a molar excess of maleic anhydride to hydroxyl groups is normally required so that the resulting reaction mixture is fluid.

When using a solvent, the amount employed is usually the minimum necessary to achieve swelling or solubilization of the hydroxyl-containing compound; typically, solvent comprises about 5% to 60%, more preferably from about 5% to about 20% by weight of the reaction mixture. Unexpectedly, use of low levels of solvent generally leads to improved esterification yields.

When the hydroxyl-containing compound is highly swelled by the solvent, the order of reactant addition can be important. Thus, it is often preferable to have the maleic anhydride and catalyst dissolved in the solvent first, and to heat this solution to 50° C. The hydroxyl-containing compound is then added. The hydroxyl-containing compound partially esterifies during the addition, preventing the viscosity from becoming excessively high.

The step 1 reaction herein and the product thereof are typically represented by (XVII)

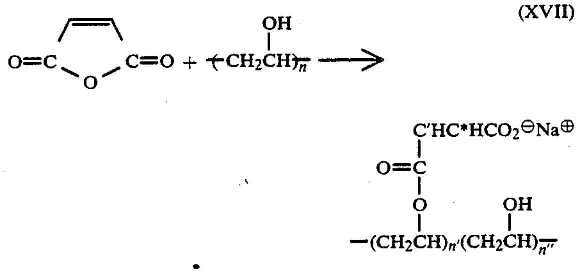

wherein XVII is a typical butenedioate half-ester which can contain cis- or trans- configurations of the double bond between C'and C*. Up to 80% or more of the mer-units can be functionalized; e.g., in XVII n' and n'' are, respectively 0.8 X or more and 0.2 X or less as fractions of the overall degree of polymerization. Other mer-units, such as those derived from vinyl acetate, e.g.,

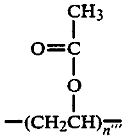

can commonly be present. The first synthesis step herein is further illustrated by nonlimiting Examples I-V hereinafter.

The following patents and patent documents, all incorporated herein by reference, further illustrate the first step used in preparing compounds of the invention. The compounds described in these references are generally suitable herein as butenedioate half-ester starting compounds for the step 2 reaction described hereinafter: U.S. Pat. No. 4,021,359, Schwab, issued May 3, 1977; Russian Journal Article Vysokomol. Soedin., Ser. B., 1976, Vol 18 (11), pages 856-8, Korshak et al; and Japanese patent documents JP No. 85/1480, assigned to Nippon Shokubai, published Jan. 10, 1985; JP No. 79/20093, Yoshitake, published Sept. 13, 1979; JP No. 77/85353, assigned to Kuraray KK, published July 15, 1977; JP No. 78/52443, assigned to Kuraray KK, published Apr. 28, 1978; JP No. 84/36331, assigned to Nippon Oils and Fats KK, published Feb. 29, 1984; JP No. 78/27119, assigned to Kuraray KK, published Mar. 7, 1978; JP No. 77/59083, assigned to Kuraray KK, published May 20, 1977; JP No. 77/94481, assigned to Kuraray KK, published Aug. 5, 1977 and JP No. 77/94482, assigned to Kuraray KK, published Aug. 5, 1977.

By reacting the butenedioate half-esters of the first step using a particular second step (itself part of the invention), the compounds of the invention are readily secured.

Second Step

The second step of the synthesis of compounds of the invention presents a significant technical challenge. If the above-described half-esters are to be reacted with particularly defined amines or amino acids (generally of a water-soluble type; see reaction [i] below), it is necessary to use an aqueous solvent system for the reaction because of the low solubility of the amine or amino-acid in common organic solvents. However, use of an aqueous solvent system inherently introduces competing reactions, such as ester hydrolysis of the butenedioate half-ester reactant or of the 2-amino-4-oxobutanoate product.

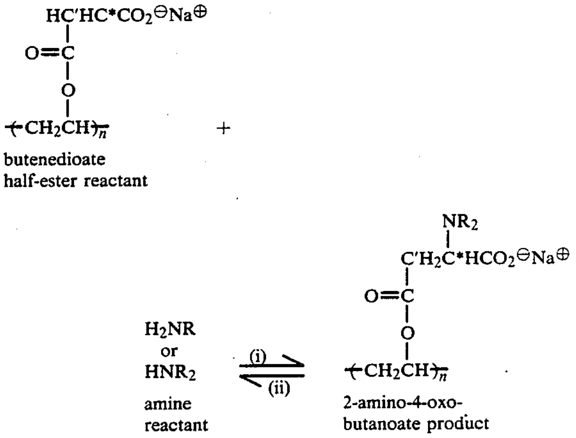

The process of the present invention overcomes the ester hydrolysis problem and allows the step 2 reaction (i) to proceed smoothly with minimized reverse reaction (ii) to provide 2-amino-4-oxobutanoate compounds as noted, in high yield.

Step 2 Reaction

Reactants used are typically
(a) a particularly defined amine or amino-acid of formulas $L^1H$ through $L^{14}H$;
(b) sodium hydroxide (preferably as an aqueous solution);
(c) water (solvent);
(d) butenedioate half-ester of step 1; and
(e) sodium carbonate.

The procedure typically involves
(i) comixing (a), (b) and (c);
(ii) cooling the mixture, typically to 0–10° C.;
(iii) adding (d);
(iv) progressively warming, to a temperature not in excess of about 100° C., more typically up to about 80° C., preferably not in excess of about 65° C., so that (d) disperses or dissolves;
(v) adjusting the temperature to below about 50° C.;
(vi) adding (e); and
(vii) reacting the reaction mixture at a temperature ("reaction temperature") generally above ambient temperature, typically about 20° C. to about 80° C. depending upon a temperature-alkalinity relationship further detailed hereinafter, to form the product. (Reaction times are typically about 1 to about 24 hours.)

In the above, the amounts of (a) and (d) are selected according to stoichiometry. Compounds of the invention derived by this procedure may be used as directly prepared or may be further purified, prior to use in detergent compositions.

In general, the reactant (a) in the above procedure is a water-dispersible or soluble amine or amino acid, which has at least one amino group which when protonated, has a pKa less than about 11. This amino group is necessarily primary or secondary (since it is used for making a sec- or tert- product of step 2 respectively) and is not subject to significant steric hindrance. Amines or amino-acids having some degree of steric hindrance can be used, provided that the reactions proceed at a reasonable rate. In general, the term amino-acid encompasses aminocarboxylic acids, aminosulfuric acids and aminosulfonic acids.

In general, when the reactant (a) is not an amine but is an amino-acid derivative, reactant (a) can be used as a fully or partially neutralized water-soluble cation salt. To illustrate, suitable variants of a preferred reactant (a) based upon the group $L^7$ illustrated hereinabove include the salt $L^7H$, i.e., aminoethylsulfuric acid sodium salt, and free aminoethylsulfuric acid. For convenience, such reactant is simply identified as "aminoethylsulfate". Other preferred reactants (a) are sodium salts of formulae $L^1H$ and $L^6H$ and $L^8H$ through $L^{14}H$, together with their corresponding free acids.

In addition to the reactant selection, order of addition and temperature control, all as noted, the following are found to be especially important parameters to secure compounds of the invention in good yield from the step 2 reaction:

(i) alkalinity;
(ii) buffering; and
(iii) water content.

In the above, control of alkalinity is most important; specific buffering provides the means for alkalinity control, and control of water content is highly desirable.

The step 2 reaction uses generally high alkalinity. pH is not an exact measure at the high concentrations used, but as a guideline, alkalinity is typically greater than or equal to pH of about 10. However, high alkalinity alone can result in ester hydrolysis as noted.

Thus, to prevent hydrolysis in the alkaline reaction mixture, a combined $NaOH/Na_2CO_3$ alkalinity/buffering system is used. (It will be appreciated that in the presence of acidic organic reactants, a carbonatebicarbonate buffer system is set up, i.e., the inorganic salts present in situ comprise NaOH, Na and $Na_2CO_3$ and $NaHCO_3$). In the simple case of reacting an amine such as ethanolamine (1 mole) with a butenedioic acid half-ester (1 mole), about 0.1 mole of NaOH followed by about 0.5 moles $Na_2C_3$ are used. Thus, the $NaOH/Na_2CO_3$ amount in total is calculated to fully neutralize the acid and provide an excess of alkalinity to enable the forward reaction. When the amine itself is an $\alpha$-amino acid, e.g., aspartic acid (1 mole), about 2.6 moles of NaOH and about 0.5 moles of $Na_2CO_3$ are used. Together, these amounts are the acid present, neutralize the butenedioic portion of the acid present, neutralize the 2 moles of $H^+$ present in the aspartic acid and provide 0.6 moles excess base. The relatively large amount of excess base is needed because of the high $pK_a$ of the aspartate ammonium group (~9.7 compared with only ~9.0 for the ethanolamine ammonium group). In the case of $\beta$-amino acids (1 mole), the amounts of NaOH (1.1 mole) and $Na_2CO_3$ (0.5 moles) are calculated analogously by those of the ethanolamine illustration hereinabove, but also take into account the amino acid carboxylate groups. Clearly, this procedure suggests that it is appropriate to select the proportions of $NaOH/Na_2CO_3$ in general, in accordance with the pKa's of ammonium groups of the amines and in accordance with the number of moles acidic carboxylate added in total from both possible sources (butenedioic half-ester and acidic amino carboxylate).

In general, it is also possible to use alternative buffer systems provided that they effectively buffer in a pH region similar to the hydroxide/carbonate/bicarbonate system illustrated.

The step 2 reaction also uses high aqueous concentrations of reactants (a) and (d). Taking these components together, calculated as the sodium salts, weight concentrations in the range from about 30% to about 60%, more preferably from about 40% to about 55% of the reaction mixture are typically used.

The step 2 reaction further appears to have a combined alkalinity-temperature relationship which, for best results, needs to be optimized. Thus, higher alkalinity and lower temperatures work effectively together; conversely lower alkalinity together with higher reaction temperatures provide a second set of optimum reaction conditions. The lower reaction temperature optimum and higher reaction temperature optimum are illustrated as follows for the aspartic acid system described:

| t °C. | Moles Aspartic Acid | Moles Butenedioic ½-ester | Moles $Na_2CO_3$ | Moles NaOH |
|---|---|---|---|---|
| 37° C. | 1 | 1 | 0.5 | 2.6 |
| | | | (as noted above) | |

and

| t °C. | Moles Aspartic Acid | Moles Butenedioic ½-ester | Moles $Na_2CO_3$ | Moles NaOH |
|---|---|---|---|---|
| 64° C. (second optimum). | 1 | 1 | 0.71 | 1.8 |

While not intending to be limited by theory, it is foreseeable that for each of the amines $L^{l-14}H$ herein, similar optima will exist. These are readily identified within the typical range of temperature and $NaOH/Na_2CO_3$ usage specified herein.

GENERAL PROCEDURES (STEP 1)

1A. Product of Reacting Maleic Anhydride with —OH Reactant Alcohols

To a weighed 500 mL three-neck round bottom flask fitted with a mechanical stirrer, condenser, and gas outlet are added tetrahydrofuran (20 ml), maleic anhydride (68.99 g, 0.704 mol), and sodium acetate (0.0288 g, 0.000352 mol). The reaction mixture is heated under argon in an oil bath held at 50° C. The —OH reactant (in an amount sufficient to provide 0.352 mol of hydroxyl groups) is added over 5 minutes to the reaction mixture, with rapid stirring. The oil bath temperature is then raised to 65° C.; the reaction mixture is maintained at about this temperature for about 6 to about 42 hours to give a clear solution of product. The extent of esterification is determined using Procedure 1C, then solvent is stripped from the 1B. Purification, optionally, can be carried out as follows. This procedure is especially applicable when the —OH reactant is polyvinyl alcohol.

Excess maleic anhydride is removed from the product of Procedure 1A (as directly prepared) by dissolving the product of Procedure 1A in tetrahydrofuran (100 ml) with stirring and then pouring the resulting solution into three times its volume of water. Most generally, the tetrahydrofuran/water volume/volume ratio is from about ½ to about 1/12. This yields a two-phase liquid mixture. The desired product is in the lower layer or phase, leaving excess or free maleic acid in the upper layer or phase. The lower layer is separated and is freeze-dried. Its ester content can be determined by Procedure 1E.

1C. Determination of Butenedioate Half-Ester Content

The sides of the round-bottom flask and condenser from 1A are rinsed with THF to return any sublimed maleic anhydride back to the reaction mixture. The reaction flask and its contents are weighed and the weight of reaction mixture determined by difference. A weighed aliquot (~250 mg) of the mixture is removed and titrated with 0.1 N sodium hydroxide using phenol red as indicator. Assuming no loss of reactants during the course of the reaction, the butenedioate half-ester content is calculated as:

$Q_1$ = moles butenedioate half-ester per gram of reaction mixture −2 (moles maleic anhydride used per gram of reaction mixture) - (moles residual acid as determined by the titration, expressed per gram of reaction mixture). Since it is known how many moles of hydroxy groups are present in the —OH reactant used in reaction 1A, it is also possible to determine the average degree of esterification of the sample. On a mole percentage basis, the degree of esterification is given by the above-determined amount $Q_l$ divided by the moles of hydroxy groups present in the —OH reactant used, per gram of reaction mixture.

1D. Determination of Total Acidity of Product of 1A or 1B

An aliquot of product of 1A or 1B is titrated using 0.1 N NaOH to a phenol red end-point and the quantity $Q_2$ = moles acid group per gram of butenedioate half-ester is determined.

1E. Determination of Butenedioate Half-Ester Content of p Purified Product of 1A To a 25 mL one-neck round bottom fitted with a stir bar, condenser and gas outlet is added a weighed (~30 mg) aliquot of the half ester product of Procedure lB. 0.1 N sodium hydroxide (10.0 ml, 1.0 mol) is added. The reaction mixture is heated under argon using an oil bath at 100° C for 30 minutes so as to completely hydrolyze all esters. The reaction mixture is cooled to room temperature and titrated with a 0.1 N hydrochloric acid to a phenol red end point. The difference between this titre per gram of reaction mixture and $Q_2$ (determined in Procedure 1D) gives $Q_1$ (the molar amount of ester units per gram of purified product of 1A).

Using the above-described procedures, selecting specific —OH reactants according to the following table, the first step of the synthesis is carried out:

| Example | —OH reactant Selected |
|---|---|
| 1 | ethanol |
| 2 | iso-propanol |
| 3 | penta-erythritol |
| 4 | sorbitol |
| 5 | poly vinyl alcohol |

2A. Addition of Aminofunctional Reactant (a) to Product of Procedures 1A or 1B at 37° C.

Select an amount Y grams of product of Procedure 1A or 1B, analyzed to determine $Q_1$ (using procedures 1C or 1E) and $Q_2$ (using Procedure 1D). The weight taken is selected to provide 0.017 moles of butenedioate half-ester groups. To a 25 mL three-neck round bottom fitted with a gas inlet and means for mechanical stirring are added amine reactant (0.017 mol), water (2.5 g), and an aqueous solution comprising 40% by weight sodium hydroxide. The weight (W) of this 40% NaOH solution is $$W = \frac{40}{0.4}(0.6 \times 0.017) + (Q_2 \times Y) + (2 \times 0.017) - (2 \times 0.0085)$$

when the amine reactant selected is aspartic acid, $$W = \frac{40}{0.4}(0.6 \times 0.017) + (Q_2 \times Y) + (1 \times 0.017) - (2 \times 0.0085)$$

when the amine reactant selected is sarcosine or glycine, and $$W = \frac{40}{0.4}(0.6 \times 0.017) + (Q_2 \times Y) - (2 \times 0.0085)$$

when the amine reactant selected is ethanolamine.

The reaction mixture is cooled by placing the flask in an ice bath and the Y gram aliquot of the product of procedure 1A or 1B is added in a single portion with stirring. The reaction flask is heated using an oil bath at 37° C. with vigorous stirring. Typically, a milky suspension is obtained. Then sodium carbonate (0.8079, 0.0085 mol) is added slowly, so as to prevent excessive foam formation. The reaction mixture is kept in the oil bath at 37° C. for 4 hours, cooled to room temperature and then diluted with an equal volume of water. This solution is adjusted to pH 7 with 0.1 N sulfuric acid and then freeze-dried to give a white solid. Alternatively, without adjusting pH, purification procedure (see 2C or 2D hereinafter) is used.

Using the above-described Procedure 2A, the products of the first step of the synthesis are used to make compounds of the invention as follows:

Products of Procedure 2A

| Products of Procedure 2A | | | |
|---|---|---|---|
| Example | Product of Procedure 1A or B | Amine Reactant | Structure Type of Product of Procedure 2A |
| 6 | Product of Ex. 1 | aspartic acid | Mixture of $L^1$-substituted Ia and Ib; isomer Ia predominant |
| 7 | Product of Ex. 1 | sarcosine | I, $L^9$ |
| 8 | Product of Ex. 1 | glycine | I, $L^3$ |
| 9 | Product of Ex. 1 | ethanolamine | I, $L^4$ |
| 10 | Product of Ex. 2 | aspartic acid | I, $L^1$ |
| 11 | Product of Ex. 3 | aspartic acid | III, $L^1$ |
| 12 | Product of Ex. 4 | aspartic acid | VIII, $L^1$ |
| 13 | Product of Ex. 5 | aspartic acid | XI, $L^1$ |
| 14 | Product of Ex. 5 | sarcosine | XI, $L^9$ |
| 15 | Product of Ex. 5 | glycine | XI, $L^3$ |
| 16 | Product of Ex. 5 | ethanolamine | XI, $L^4$ |

EXAMPLE 17

To a weighed 500 ml three-neck round bottom flask fitted with stir bar, condenser, and gas outlet are added tetrahydrofuran (125 ml), maleic anhydride (68.99 g, 0.704 mol), and sodium acetate (0.0288 g, 0.000352 mol). The reaction mixture is heated to 50° C under argon in an oil bath. Polyvinylalcohol (GOHSENOL tradename from Nippon Gohsei, degree of polymerization ≅100, 87% hydrolyzed, 20.0 g, 0.352 mol of hydroxyl groups) is slowly added. The oil bath temperature is then raised to 65° C.; the reaction mixture is maintained at about this temperature for 28 hours to give an amber solution. The degree of esterification of the polyvinylalcohol is determined by Procedure 1C to be 79%. Then solvent is stripped from the reaction mixture to provide a solid, gummy product (97.7 g) which is purified as follows.

The gummy product is dissolved with stirring in tetrahydrofuran (100 ml) at room temperature; this solution is poured into vigorously stirred water (500 ml) to give a two-phase liquid. The desired product is in the bottom liquid phase leaving excess or free maleic acid in the top liquid phase. The bottom liquid phase is separated and the tetrahydrofuran stripped off to provide a viscous, beige liquid (68.0 g). This liquid is mixed with water (50 ml) and then freeze-dried to give a beige solid, 42.3 g; $^1$HNMR (referenced to 3-[trimethylsilyl] propionic-2,2,3,3-$d_4$ acid, sodium salt), δ1.3-2.5 (broad multiplet), 4.5-5.4 (broad multiplet), 5.9-6.5 (multiplet). The beige solid is reacted with aspartic acid using the following method:

The beige solid was first analyzed to determine $Q_1$ and $Q_2$ using Procedures 1E and 1D, respectively: $Q_1=0.00681$ moles butenedioate half-ester groups per gram of solid, $Q_2=0.006876$ moles acid groups per gram of solid. The amount of beige solid to provide 0.017 moles of butenedioate half-ester groups can be calculated:

$$Y = \frac{0.017}{Q_1} = 2.5 \text{ grams}$$

To a 25 ml three-neck round bottom fitted with a gas inlet and means for mechanical stirring is added aspartic acid (2.27 g, 0.017 mol) deuterium oxide (2.5 g), and an aqueous solution comprising 40% sodium deuteroxide. The weight of NaOD solution is $$w = \frac{41}{0.4}[(0.6 \times 0.017) + (0.006876 \times 2.5) + (2 \times 0.017) - (2 \times 0.0085)] = 4.54 \text{ grams}$$

The reaction mixture is cooled by placing the flask in an ice bath and the 2.5 g aliquot of the beige butenedioic half-ester solid is added in a single portion with stirring.

The reaction flask is heated with stirring using an oil bath at 37° C. Then sodium carbonate (0.900 g, 0.0085 mol) is added slowly, so as to prevent excessive foam formation. The reaction mixture is kept in the oil bath at 37° C. for 4 hours and then diluted with an equal volume of water; the pH of this solution is 9.81. Next the pH of the solution is adjusted to 7.0 using 0.1 N sulfuric acid and then freeze-dried to give a white solid (5.8 g). This solid is purified further using gel permeation chromatography as described in Procedure 2D, below.

The white solid (0.92 g) is dissolved in 10 ml of water. This solution is loaded onto a 2.5×95 cm column of BIOGEL P2 (BioRad Corp.) or equivalent polyacrylamide gel and eluted at a flow rate of 12-16 ml/hour for about 5.5 hours, and then at 25-35 ml/hour for 8 hours. The desired product elutes in the 250-400 ml volume fraction, the impurities in the 400-470 ml fraction. The 250-400 ml volume fraction is freeze dried to give a white solid: 0.30 g; H$^1$NMR (referenced to 3-[trimethylsilyl] propionic acid-2,2,3,3-$d_4$ acid, sodium salt) δ1.3-2.1 (broad multiplet), 2.5-3.1 (broad multiplet), 3.5-4.0 (broad multiplet), 4.7-5.3 (broad multiplet); elemental analysis: C, 38.57%; H, 4.58%; N, 3.32%.

EXAMPLE 18

To a weighed 1000 ml three-neck round bottom flask fitted with mechanical stirrer, condenser, and gas outlet are added tetrahydrofuran (170 ml), maleic anhydride (493.8 g, 5.04 mol), and sodium acetate (0.225 g, 0.0027 mol). The mixture is heated under argon in an oil bath to 50° C. until the maleic anhydride dissolves. Polyvinylalcohol (GOHSENOL, Nippon Gohsei, degree of polymerization ≅100, 87% hydrolyzed, 150.0 g, 2.63 mol of hydroxyl groups) is added over about 3 minutes. The oil bath temperature is then raised to 65° C; the reaction mixture is maintained at about this temperature for 25 hours to give an amber viscous solution. The degree of esterification of the polyvinylalcohol is determined by Procedure 1C to be 97%.

The reaction mixture (about 700 ml) is poured with stirring into vigorously stirred water (2000 ml) at 10° C., to give a two-phase liquid. After stirring for 1 hour at 25° C., the phases are allowed to separate. The desired product is in the lower liquid phase, leaving excess or free maleic acid in the upper liquid phase. The lower liquid phase (about 500 ml) is removed and diluted with fresh tetrahydrofuran (800 ml). The resulting solution is poured into fresh water (1400 ml) and stirred vigorously for 1 hour at 25° C. Decantation of the lower liquid phase into four 9"×15" glass baking pans to a depth of 1 cm is followed by evaporation in the hood for 18 hours. Residual solvent is removed from the gummy material in vacuo for 48 hours at 25° C, producing a rigid, glassy foam. This is then pulverized to an off-white powder (272 g). $^1$HNMR (referenced to 3-[trimethylsilyl] propionic-2,2,3,3-$d_4$-acid, sodium salt), δ1.3-2.5 (broad multiplet), 4.5-5.4 (broad multiplet), 5.9-6.5 (multiplet). This solid is reacted with aspartic acid using the following method:

The solid is first analyzed to determine $Q_1$ and $Q_2$ using Procedures 1E and 1D, respectively: $Q_1=0.00602$ moles butenedioate half-ester groups per gram of solid, $Q_2=0.00595$ moles acid groups per gram of solid. The amount of solid to provide 0.244 moles of butenedioate half-ester groups is calculated as $$Y = \frac{0.244}{Q_1} = 40.5 \text{ grams}$$

An aspartate solution is made by dissolving aspartic acid (45.3 g, 0.341 mol), water (50 g), and a 50% w/w solution of sodium hydroxide in water (62.8 g). This solution is cooled to about 0° C. The amount of the sodium hydroxide used is based upon the following calculation:

$$W = \frac{40}{0.5}[(0.6 \times 0.340) + (0.00595 \times 40.5) + (2 \times 0.340) -$$

-continued (2 × 0.0170)] = 62.8 grams

To a 500 ml, 3-neck round bottom flask fitted with a gas inlet, mechanical stirrer and two addition funnels are comixed at 0° C., each in a number of about equal portions from its separate addition funnel, the "Y" gram aliquot of butenedioic half-ester solid (40.5 g, 0.244 mol) and simultaneously, aspartate solution (158.1 g) over about 15 minutes. The reaction mixture is mixed with vigorous stirring, to produce a creamy, viscous whip. The reaction vessel is then warmed to about 37° C. in an oil bath. Sodium carbonate (18.0 g, 0.17 mol) is now added slowly, to prevent excessive foam formation. The reaction mixture is kept in the oil bath at 37° C. for 4 hours, is cooled to ambient temperature and is then diluted with an equal volume of water; the pH of this solution is 9.81. The product can now optionally be purified using procedure 2B. If it is desired to use the product without the purification procedure 2B, the pH of the solution is adjusted to 7.0 using 1.0 N sulfuric acid and then freeze-dried to give a white solid (136 g). This material can be used without further purification as a random copolymer suitable for use e.g., at levels of from about 0.1% to about 10%, as a dispersant in laundry detergent formulations, as further illustrated hereinafter; such formulations comprise a detersive surfactant and need not comprise any conventional dispersant such as polyacrylate.

2B. Purification of the Product of Procedure 2A

Polyol-derived crude products can simply be purified by precipitation from aqueous solution. For example, polyvinylalcohol-derived products can be precipitated at a pH of about 2.4.

More generally, contaminants such as maleic acid, fumaric acid, and traces of the starting amine reactant can be removed by pouring the crude product solution (as directly prepared before pH adjustment to 7) into methanol (typically 3 to 6 times by volume). The desired product precipitates enriching the solution with contaminants. However, some quantity of contaminants may still be in the precipitate. This precipitate can be further purified by dissolving it in water to make a 50% by weight solution and then pouring this solution into methanol. The desired product precipitates. This procedure can be repeated several times to further remove impurities from the desired product.

2C. An alternative purification procedure can be carried out using gel permeation chromatography to separate the components of the reaction mixture by molecular weight. The fractionation is carried out at room temperature using a 2.5×100 cm Altex column; the eluent is monitored by a Waters Model R403 refractive index detector. Eluent flow is maintained by a Master Flex peristaltic pump. The gel used generally is Bio Gel P-2 (approximately 150 g). The void volume of the column is approximately 150 ml.

Approximately 0.5 g of the product of procedure 2A is dissolved in 5 ml of water. This solution is loaded on a column and eluted at a flow rate of about 12–15 ml/hour. The order that the components elute corresponds to their molecular weight; high molecular weight components elute first, lower molecular weight components elute later. Subsequent to gpc purification, compounds of the invention are characterized in the normal manner by NMR spectroscopy, elemental analysis and the like.

Detergent Compositions

Compounds of the invention are effective dispersants, especially for clay soils, magnesium silicate and calcium pyrophosphate. They may be used at low levels in laundry detergents as dispersants or at higher levels, as laundry detergent builders.

Depending on whether it is desired to use compounds of the invention primarily in a dispersant role or primarily in a builder role, it is possible to incorporate the compounds at a wide range of levels in laundry detergent compositions. Compounds of the invention, as prepared, may thus be directly incorporated into laundry detergents at levels ranging from about 0.1 to about 35%, and higher, by weight of the finished composition. The preferred dispersant applications use levels in the range from about 0.1% to about 6% by weight of the laundry detergent composition while the preferred builder applications typically use levels in the range from about 6% to about 35%.

While it is possible to formulate very simply by use of no more than a single surfactant, preferred laundry detergent compositions herein are more complex. For example, when using the compounds as dispersants, at least one surfactant and at least one conventional detergent builder are typically used, the latter preferably phosphate-free or in the form of pyrophosphate.

In preparing laundry detergent formulations, precautions are generally taken to avoid directly contacting the compounds of the invention with concentrated acids or alkalis, especially when elevated temperatures are used in formulation. Typical laundry detergent formulas for use herein include both phosphate-built and, preferably, phosphate-free built granules, pyrophosphate-containing built granules, phosphate-free built liquids and European-style nil-phosphate granules. See the following patents and patent applications, all incorporated herein by reference.

Compounds of the invention, as prepared, can simply replace at dispersant levels the polyacrylate component of conventionally formulated laundry detergents, or at builder levels, the builder component, with excellent results.

More particularly, the detergent formulator will be assisted by the following disclosure:

Detersive Surfactants: The detergent compositions of this invention will contain organic surface-active agents ("surfactants") to provide the usual cleaning benefits associated with the use of such materials.

Detersive surfactants useful herein include well-known synthetic anionic, nonionic, amphoteric and zwitterionic surfactants. Typical of these are the alkyl benzene sulfonates, alkyl- and alkylether sulfates, paraffin sulfonates, olefin sulfonates, amine oxides, alpha-sulfonates of fatty acids and of fatty acid esters, alkyl glycosides, ethoxylated alcohols and ethoxylated alkyl phenols, and the like, which are well-known from the detergency art. In general, such detersive surfactants contain an alkyl group in the $C_9$–$C_{18}$ range; the anionic detersive surfactants can be used in the form of their sodium, potassium or triethanolammonium salts. Standard texts such as the McCutcheon's Index contain detailed listings of such typical detersive surfactants. $C_{11}$–$C_{14}$ alkyl benzene sulfonates, $C_{12}$–$C_{18}$ paraffinsulfonates, and $C_{11}$–$C_{18}$ alkyl sulfates and alkyl ether sulfates are especially preferred in the compositions of the present type.

Also useful herein are the water-soluble soaps, e.g., the common sodium and potassium coconut or tallow soaps well-known in the art. Unsaturated soaps such as alkyl soaps may be used, especially in liquid formulations. Saturated or unsaturated $C_9$–$C_{16}$ hydrocarbyl succinates are also effective.

The surfactant component can comprise as little as about 1% to as much as about 98% of the detergent compositions herein, depending upon the particular surfactant(s) used and the effects desired. Generally the compositions will contain about 5% to about 60%, more preferably about 6% to 30%, of surfactant. Mixtures of the anionics, such as the alkylbenzene sulfonates, alkyl sulfates and paraffin sulfonates, with $C_9$–$C_{16}$ ethoxylated alcohol surfactants are preferred for through-the-wash cleansing of a broad spectrum of soils and stains from fabric.

Combinations of anionic, cationic and nonionic surfactants can generally be used. Such combinations, or combinations only of anionic and nonionic surfactants, are preferred for liquid detergent compositions. Such surfactants are often used in acid form and neutralized during preparation of the liquid detergent composition. Preferred anionic surfactants for liquid detergent compositions include linear alkyl benzene sulfonates, alkyl sulfates, and alkyl ethoxylated sulfates. Preferred nonionic surfactants include alkyl polyethoxylated alcohols.

Anionic surfactants are preferred for use as detergent surfactants in granular detergent compositions. Preferred anionic surfactants include linear alkyl benzene sulfonates and alkyl sulfates. Combinations of anionic and nonionic detersive surfactants are especially useful for granular detergent applications.

Detersive Adjuncts: The compositions herein can contain other ingredients which aid in their cleaning performance. For example, it is highly preferred that the laundry compositions herein also contain enzymes to enhance their through-the-wash cleaning performance on a variety of soils and stains. Amylase and protease enzymes suitable for use in detergents are well-known in the art and in commercially available liquid and granular detergents. Commercial detersive enzymes (preferably a mixture of amylase and protease) are typically used at levels of 0.001% to 2%, and higher, in the present compositions.

Moreover, the compositions herein can contain, in addition to ingredients already mentioned, various other optional ingredients typically used in commercial products to provide aesthetic or additional product performance benefits. Typical ingredients include pH regulants, perfumes, dyes, bleaches, optical brighteners, polyester soil release agents, fabric softeners, hydrotropes and gel-control agents, freeze-thaw stabilizers, bactericides, preservatives, suds control agents, bleach activators and the like.

Other Detersive Adjuncts: Optionally, the fully-formulated detergent compositions herein can contain various metal ion sequestering agents such as amine chelants and phosphonate chelants, such as diethylenetriamine pentaacetates, the alkylene amino phosphonates such as ethylenediamine tetraphosphonate, and the like. Clay softeners such as the art-disclosed smectite clays, and combinations thereof with amines and quaternary ammonium compounds can be used to provide softening-through-the-wash benefits. Adjunct builders can be used at typical levels of 5–50%. Such materials include 1–10 micron Zeolite A; 2,2'-oxodisuccinate, tartrate mono- and di-succinates, citrates, $C_8$–$C_{14}$ hydrocarbyl succinates, sodium tripolyphosphate, pyrophosphate, carbonate, and the like. Inorganic salts such as magnesium sulfate can also be present.

In a through-the-wash fabric laundry mode, the laundry detergent compositions are typically used at a concentration of about 0.10% to about 2.5%, in an aqueous laundry bath, typically at pH 7–11, to launder fabrics. The laundering can be carried out by agitating fabrics with the present compositions over the range from 5° C. to the boil, with excellent results, especially at temperatures in the range from about 35 to about 80° C.

The following abbreviations are used in the Examples hereafter:

LAS: sodium linear alkylbenzene sulfonate having a $C_{12}$, $C_{11-12}$ or $C_{13}$ alkyl chain AS: $C_{12-20}$ alcohol sulfate, e.g., sodium tallow alcohol sulfate NI: $C_{12-13}$ or $C_{14-15}$ primary alcohol with 6–7 moles ethoxylation; Dobanol or Neodol $Q_1$: $C_{12-14}$ trimethylammonium chloride or bromide $Q_2$: di-$C_{16-18}$ dimethylammonium chloride $A_1$: ditallowmethylamine or distearylmethylamine BENT: white bentonite/montmorillonite clay; impalpable and having cation exchange capacity 50–110 meg/100 g STPP: sodium tripolyphosphate ORTHO: sodium orthophosphate PYRO: sodium pyrophosphate NTA: nitrilotriacetic acid $Z_4A$: Zeolite 4A 1–10 micron size CARBONATE: sodium carbonate, anhydrous SIL1CATE: sodium silicate having $Na_2O$:$SiO_2$ ratio 1.6:1; expressed as solids ODS: tetrasodium 2,2'-oxodisuccinate TMS/TDS: mixture of tartrate monosuccinate and tartrate disuccinate in 80/20 or 85/15 weight ratio; sodium salt form ACR1: polyacrylic acid of average molecular weight about 4,500 as sodium salt ACR2: copolymer of 3:7 maleic/acrylic acid, average 1 10 molecular weight about 60,000–70,000, as sodium salt $MgSO_4$: magnesium sulfate, anhydrous basis $Na_2SO_4$: sodium sulfate, anhydrous basis CHELANT: (used interchangeably)

EDDS: S,S-ethylenediamine disuccinic acid

EDTMP: ethylene diamine tetra(methylenephosphonic acid)

DETPMP: Diethylenetriamine penta (methylene phosphonic acid)

DTPA: diethylenetriamine penta(acetic acid)

CMC: sodium carboxylmethylcellulose $PB_4$: sodium perborate tetrahydrate $PB_1$: sodium perborate monohydrate TAED: tetraacetyl ethylene diamine NOBS: sodium nonanoyl oxobenzenesulfonate INOBS: sodium 3,5,5-trimethyl hexanoyl oxybenzene sulfonate SRP: linear copolymer of ethylene glycol or 1,2-propylene glycol and dimethylterephthalate, preferably having low molecular weight (e.g., about 25,000 or lower) and incorporating sulfonated groups Highly desirable optional ingredients also include proteolytic enzyme (Alcalase, Maxatase, Savinase, Amylase [Termamyl]) and brighteners (DMS/CBS, e.g., disodium 4,4'-bis(2-morpholino-4-anilino-5-triazin-6-ylamino) stilbene-2:2'-disulfonate). The balance of the compositions comprises water and minor ingredients such as perfumes; silicone/silica or soap, e.g., tallow fatty acid suds suppressors; Polyoxyethylene Glycols, e.g., PEG-8000; and hydrotropes, e.g., sodium toluene sulfonate).

EXAMPLE 19

| | A | B | C | D | E | F |
|---|---|---|---|---|---|---|
| LAS | 7.4 | 14.8 | 0 | 7.4 | 0 | 7.4 |
| TAS | 7.4 | 0 | 0 | 7.4 | 14.8 | 7.4 |
| NI | 1.5 | 0 | 14.8 | 1.5 | 0 | 1.5 |
| CARBONATE | 17.3 | 17.3 | 17.3 | 17.3 | 17.3 | 17.3 |
| SILICATE | 4.7 | 4.7 | 4.7 | 4.7 | 4.7 | 4.7 |
| $Z_4A$ | 24.0 | 24.0 | 24.0 | 24.0 | 24.0 | 24.0 |
| Product of Example 17 | 0.1 | 0.1 | 2 | 3 | 4 | 5 |
| Balance: Water to | 100 | 100 | 100 | 100 | 100 | 100 |

| | G | H | I | J | K | L |
|---|---|---|---|---|---|---|
| LAS | 7.4 | 0 | 7.4 | 7.4 | 7.4 | 7.4 |
| TAS | 7.4 | 14.8 | 7.4 | 7.4 | 7.4 | 7.4 |
| NI | 1.5 | 0 | 1.5 | 1.5 | 1.5 | 1.5 |
| CARBONATE | 17.3 | 17.3 | 17.3 | 17.3 | 17.3 | 17.3 |
| SILICATE | 4.7 | 4.7 | 4.7 | 4.7 | 4.7 | 4.7 |
| $Z_4A$ | 24.0 | 24.0 | 24.0 | 10 | 5 | 0 |
| Product of Example 17 | 6 | 7 | 10 | 15 | 20 | 30 |
| Balance: Water to | 100 | 100 | 100 | 100 | 100 | 100 |

For each of A–L, an aqueous mixture is prepared by coadding the ingredients, at the indicated weight percentages above, the product of Example 17 in each instance being added last. City water is used to prepare the solutions.

Laundry baths are then prepared having 1,500 ppm of each solution by further diluting the mixtures in the same city water (hardness 12 grains/ gallon). Fabrics are added thereto and are laundered at 125° F. (52° C.) in a Terg-O-Tometer (U.S. Testing Co.).

The product of Examples 6–16 and 18 are each substituted for the product of Example 17.

EXAMPLE 20

A liquid detergent composition for household laundry use is as follows:

| Component | Wt. % |
|---|---|
| Potassium $C_{14}$–$C_{15}$ alkyl polyethoxy (2.5) sulfate | 8.3 |
| $C_{12}$–$C_{14}$ alkyl dimethyl amine oxide | 3.3 |
| Potassium toluene sulfonate | 5.0 |
| Monoethanolamine | 2.3 |
| TMS/TDS triethanolamine salt, 85/15 TMS/TDS | 15.0 |
| Sodium salt of 1,2-dihydroxy-3,5-disulfobenzene | 1.5 |
| Product of Example 17 | 1.5 |
| Balance: Distilled water to | 100 |

The components are added together with continuous mixing to form the composition.

The product of Example 18 is substituted for the product of Example 17 with equivalent results.

EXAMPLE 21

A liquid detergent composition for household laundry use is prepared by mixing the following ingredients:

| | |
|---|---|
| $C_{13}$ alkylbenzenesulfonic acid | 8.0% |
| Triethanolamine cocoalkyl ether sulfate | 8.0 |
| $C_{14-15}$ alcohol ethoxy-7 | 5.0 |
| $C_{12-18}$ alkyl monocarboxylic acids | 5.0 |
| Product of Example 17 | 5.0 |
| Diethylenetriaminepentamethylene phosphonic acid | 0.8 |
| Polyacrylic acid (avg. M.W. = ±5000) | 0.8 |
| Triethanolamine | 2.0 |
| Ethanol | 8.6 |
| 1,2-Propanediol | 3.0 |
| Maxatase enzyme (2.0 Au/g activity) | 0.7 |
| Distilled water, perfume, pH 7.6 buffers and miscellaneous Balance to | 100 |

Granular detergent compositions of Examples 22–39 are prepared as follows. A base powder composition is first prepared by mixing all components except, where present, Dobanol 45E7, bleach, bleach activator, enzyme, suds suppressor, phosphate and carbonate in crutcher as an aqueous slurry at a temperature of about 55° C. and containing about 35% water. The slurry is then spray dried at a gas inlet temperature of about 330° C. to form base powder granules. The bleach activator, where present, is then admixed with $TAE_{25}$ as binder and extruded in the form of elongated "noodles" through a radial extruder as described in U.S. Pat. No. 4,399,049, Gray et al, issued Aug. 16, 1983, incorporated herein by reference. The bleach activator noodles, bleach, enzyme, suds suppressor, phosphate and carbonate are then dry-mixed with the base powder composition. Dobanol 45E7 is sprayed into the resulting mixture. Finally, the compound(s) of the present invention are dry-added in freeze-dried form.

| | 22 | 23 | 24 | 25 | 26 | 27 | 28 |
|---|---|---|---|---|---|---|---|
| LAS | 6.0 | 8.0 | 6.0 | 6.0 | 6.0 | 6.0 | 7.0 |
| TAS | 2.5 | 0.0 | 2.5 | 2.5 | 2.5 | 2.5 | 1.0 |
| NI | 5.5 | 4.0 | 5.5 | 5.5 | 5.5 | 5.5 | 0.0 |
| $Q_1$ | — | — | — | — | — | — | 1.5 |
| $Q_2$ | — | — | — | — | — | — | 0.5 |
| $A_1$ | — | — | — | — | — | — | 3.0 |
| BENT | — | — | — | — | — | — | 5.0 |
| STPP | — | — | — | — | — | — | 24.0 |
| PYRO | — | — | — | — | — | — | — |
| NTA | — | — | — | — | — | — | — |
| $Z_4A$ | 21.0 | 20.0 | 18.0 | 21.0 | 21.0 | 21.0 | — |
| CARB | 10.0 | 15.0 | 15.0 | 12.0 | 10.0 | 10.0 | 3.0 |
| SIL | 3.0 | 5.0 | 10.0 | 6.0 | 3.0 | 3.0 | 3.0 |
| ODS | — | — | — | — | 4.0 | — | — |
| TMS/TDS | — | — | — | — | — | 2.0 | — |
| ACR1 | — | — | — | 3.0 | — | 1.0 | — |
| ACR2 | — | — | — | — | 2.0 | — | — |
| $MgSO_4$ | 0.4 | 0.4 | 0.4 | 0.4 | 0.4 | 0.4 | 0.4 |
| $Na_2SO_4$ | 11.0 | 11.0 | 11.0 | 11.0 | 11.0 | 11.0 | 11.0 |
| Chelant | 0.3 | 0.3 | 0.3 | 0.3 | 0.3 | 0.3 | 0.3 |
| CMC | 0.7 | 0.7 | 0.7 | 0.7 | 0.7 | 0.7 | 1.0 |
| $PB_4$ | — | 24.0 | — | 24.0 | — | — | 24.0 |
| $PB_1$ | 12.0 | — | 11.0 | — | 11.0 | 11.0 | — |
| TAED | 1.5 | 2.0 | — | — | — | — | — |
| NOBS | — | — | — | 2.0 | — | — | — |
| INOBS | — | — | 2.0 | — | 2.0 | 2.0 | — |
| SRP | 1.0 | — | — | — | — | — | — |
| Product of Example 17 | 4.0 | 5.0 | 5.0 | 2.0 | 1.0 | 1.0 | 1.0 |
| $H_2O$ and minors | | | | To 100 | | | |

| | 29 | 30 | 31 | 32 | 33 | 34 | 35 |
|---|---|---|---|---|---|---|---|
| LAS | 12.0 | 4.1 | 7.4 | 4.0 | 11.0 | 12.0 | 16.0 |
| TAS | 7.0 | 6.4 | 7.4 | 6.4 | 11.0 | 6.0 | — |

-continued

| | | | | | | | |
|---|---|---|---|---|---|---|---|
| NI | 0.8 | 6.4 | 1.2 | 0.3 | 1.0 | 1.0 | — |
| $Q_1$ | — | — | — | — | — | — | — |
| $Q_2$ | — | — | — | — | — | — | 5.0 |
| $A_1$ | — | — | — | — | — | — | — |
| BENT | — | — | — | — | — | — | 6.0 |
| STPP | — | 5.6 | 25.0 | 39.4 | — | — | 28.0 |
| PYRO | — | 22.4 | 5.9 | — | — | — | — |
| NTA | — | — | — | — | — | — | 3.0 |
| $Z_4A$ | 29.0 | — | — | — | 27.0 | 10.0 | — |
| CARB | 17.0 | 12.2 | 16.8 | 12.0 | 17.0 | 15.0 | 12.0 |
| SIL | 2.5 | 6.0 | 4.7 | 5.5 | 2.0 | 2.0 | 6.0 |
| ODS | — | — | — | — | — | — | — |
| TMS/TDS | — | — | — | — | — | — | — |
| ACR1 | 6.0 | — | — | — | — | — | — |
| ACR2 | — | — | — | — | — | — | — |
| $MgSO_4$ | 2.0 | — | — | — | — | — | — |
| $Na_2SO_4$ | 15.0 | 20.0 | 10.0 | 7.0 | 20.0 | 20.0 | 24.0 |
| Chelant | 1.0 | — | 0.4 | — | — | — | — |
| CMC | — | — | — | — | — | — | — |
| $PB_4$ | 15.0 | 5.0 | 5.0 | — | — | — | — |
| $PB_1$ | 4.0 | — | — | — | — | — | — |
| TAED | 3.0 | 2.0 | — | — | — | — | — |
| NOBS | — | — | 8.0 | — | — | — | — |
| INOBS | 1.0 | — | — | — | — | — | — |
| SRP | 1.0 | — | — | — | — | — | — |
| Product of Example 17 | 4.0 | 4.0 | 4.0 | 3.0 | 6.0 | 10.0 | 2.0 |
| $H_2O$ and minors | | | To 100 | | | | |

| | 36 | 37 | 38 | 39 |
|---|---|---|---|---|
| LAS | 6.0 | 6.0 | 14.0 | — |
| TAS | 3.0 | 3.0 | — | — |
| NI | 6.0 | 6.0 | — | 12.0 |
| CARB | 10.0 | 7.0 | — | — |
| SIL | 7.0 | 3.0 | — | — |
| $Na_2SO_4$ | 15.0 | 20.0 | 20.0 | 20.0 |
| $PB_4$ | 18.0 | 10.0 | 10.0 | 2.0 |
| TAED | 2.0 | 2.0 | 2.0 | 2.0 |
| Product of Example 17 | 20.0 | 25.0 | 30.0 | 15.0 |
| $H_2O$ and minors | | To 100 | | |

What is claimed is:

1. A random copolymer especially adapted for use as a dispersant in laundry detergent compositions, said random copolymer having a molecular weight in the range from about 635 to about 50,000 and comprising from about 0.10 to about 0.95 mole fraction of repeat units of the formula $$\begin{array}{c} MAO \\ | \\ -(CHCH_2)- \end{array}$$

wherein M is sodium, A is selected from—OC(O)C(L)HCH$_2$(O)C—, —OC(O)CH$_2$C(L)H(O)C—and mixtures thereof and L is selected from the group consisting of aspartate, glutamate, glycinate, ethanolamino, $\beta$-alanate, taurine, aminoethylsulfate, alanate, sarcosinate, N-methylenthanolamino, iminodiacetate, 6-aminohexanoate, Nmethylaspartate and diethanolamino; wherein said random copolymer is produced by a process comprising (i) reacting a polyvinyl alcohol with maleic anhydride to produce a butenedioate half-ester of said polyvinyl alcohol; and (ii) reacting said butenedioate half-ester with an amine reactant selected from the group consisting of aspartic acid, glutamic acid, glycine, $\beta$-alanine, ethanolamino, taurine, aminoethylsulfate, alanine, sarcosine, N-methylethanolamine, iminodiacetic acid, 6-aminohexanoic acid, N-methylaspartic acid and diethanolamine;

provided that in step (ii), the alkalinity is controlled by means of a carbonate-buffered reaction medium.

2. A random copolymer according to claim 1 wherein in step (ii), said reaction medium is a concentrated aqueous reaction medium.

3. A random copolymer according to claim 2 wherein L is aspartate and said amine reactant is aspartic acid.

4. A random copolymer according to claim 3 wherein step (i) comprises reacting a mixture formed from said polyvinylalcohol and said maleic anhydride together with tetrahydrofuran and an effective amount of a sodium acetate catalyst; provided that said mixture comprises in total no more than from about 5% to about 20% tetrahydrofuran; whereby a high yield of said butenedioate half-ester is secured.

5. A random copolymer according to claim 4 wherein the butenedioate half-ester of said polyvinyl alcohol, produced in step (i), is, prior to step (ii), purified by partitioning into the lower layer of a tetrahydrofuran/-water mixture, said mixture having a volume/volume ratio of said tetrahydrofuran and water ranging from about ½ to about 1/12.

* * * * *

UNITED STATES PATENT AND TRADEMARK OFFICE

CERTIFICATE OF CORRECTION

PATENT NO. : 4,959,409

DATED : September 25, 1990

INVENTOR(S) : S. W. Heinzman, M. J. Eis, M. P. Armstrong

It is certified that error appears in the above-identified patent and that said Letters Patent is hereby corrected as shown below:

Column 18, line 2, "5.5 hours" should be --15.5 hours--.

Column 19, line 2, "(2 x 0.0170)" should be --(2 x 0.170)--.

Column 10, line 45, "or" should be --of--.

Column 14, line 62, last part of sentence was omitted, should be --reaction mixture to provide a solid, gummy product.--

Column 15, line 23, "-2" should be --=2--.

Column 15, line 47, "1.0 mol" should be --1.0 mmol--.

Signed and Sealed this

Fifth Day of May, 1992

*Attest:*

DOUGLAS B. COMER

*Attesting Officer*

*Acting Commissioner of Patents and Trademarks*